United States Patent [19]

Lucas et al.

[11] 4,273,652

[45] Jun. 16, 1981

[54] INSTALLATION FOR FILTRATION OF A CONTAMINATED FLUID

[75] Inventors: Jean-Claude Lucas, Saint Nom La Breteche; Pierre Messirejean, Chantilly, both of France

[73] Assignees: Societe Sofiltra-Poelman; Societe Industrielle de Filtration, both of La Garenne Colombes, France

[21] Appl. No.: 70,424

[22] Filed: Aug. 28, 1979

[30] Foreign Application Priority Data

Sep. 8, 1978 [FR] France ................................ 78 25837

[51] Int. Cl.³ .......................................... B01D 15/02
[52] U.S. Cl. ..................................... 210/189; 55/390; 210/268; 210/286
[58] Field of Search ................... 55/34, 60, 61, 77, 79, 55/99, 181, 390, 434, 474, 479; 210/19, 33, 189, 268, 269, 286, 289, 291, 293; 406/163, 171, 175; 422/219

[56] References Cited

U.S. PATENT DOCUMENTS

| 3,489,464 | 1/1970 | Delfs | 406/163 |
|---|---|---|---|
| 3,565,798 | 2/1971 | Barnes | 210/19 |
| 3,575,294 | 4/1971 | Hirowatari et al. | 210/268 |
| 3,716,969 | 2/1973 | Maeda | 55/99 |
| 4,049,405 | 9/1977 | Goldsmith et al. | 55/479 |

Primary Examiner—Ivars C. Cintins
Attorney, Agent, or Firm—Lee C. Robinson, Jr.

[57] ABSTRACT

A fluid purification system having a vertical bed of granular material disposed in a tank which communicates with a charging compartment and a discharging compartment respectively positioned above and below the tank. The charging compartment is provided with a perforated bottom plate and an injection nozzle which blows in the granular material horizontally so that it drops by gravity into the beds through the plate. The discharging compartment comprises a hopper in the form of a dihedron whose arris is inclined to the horizontal in the direction of a drainage port provided at the base of the compartment. The system is of particular utility in the nuclear and chemical industries for the purification of air contaminated with radioiodines or noxious gases.

19 Claims, 7 Drawing Figures

INSTALLATION FOR FILTRATION OF A CONTAMINATED FLUID

BACKGROUND OF THE INVENTION

This invention relates to an installation for the filtration of a stream of contaminated fluid and more particularly to such an installation in which the filtration is accomplished by the use of a granular material capable of absorbing or adsorbing the contaminants.

Installations in accordance with the present invention, while of general application, are particularly well suited for use in the nuclear and chemical engineering industries to rid gaseous wastes of radioiodines, usually elemental iodine and methyl iodide, or of toxic gases or other contaminants. The granular material serves to trap these contaminants, either by adsorption or by absorption, and generally comprises activated carbon, zeolites or similar materials. The service life of such materials often is quite limited. To maintain good efficiency, the material must be replaced periodically, which requires the discharging and recharging of the beds provided in the filtration tanks. These operations are quite time consuming and give rise to handling and safety problems particularly in view of the hazard posed by contaminants in the material. Moreover, for maximum efficiency it is important that the material be of uniform particle size and uniformly packed. The prior charging operations often had a direct adverse effect on the uniformity of the particle size and on the packing conditions.

Heretofore, attempts to resolve these problems frequently made use of a mobile charging hopper. The hopper was supplied pneumatically and was moved into position above the beds. It was then necessary to open the tank partly at the top to permit the introduction of granular material from the hopper, thus exposing the operator and the surrounding atmosphere to contaminants from the tank.

Other known systems made use of a pneumatic conveyor arrangement in which the granular material was blown directly into the tank. These latter systems included piping disposed in the upper part of the tank, and the material was blown in bulk through openings in the lower portion of the tank. This blowing in of the material was not conducive to uniform distribution. Accordingly, to improve the distribution the material was agitated by means of vibrators, which needed to be kept in operation throughout the charging operation and which did not permit truly satisfactory packing. Moreover, the particles often struck the walls of the tank, with some of them breaking, thereby changing the particle size and producing dust that was then blown into the beds along with the particles themselves. In addition, many such prior systems required a special hopper for the bottom of the drum in which the material was shipped. The material commonly was discharged by means of a suction probe inserted into the lower part of the tank, which when withdrawn was dangerously contaminated.

SUMMARY

The present invention has as its object to overcome the above and other drawbacks, that is to say, to permit replacement of the filter material under optimum conditions of uniformity and without risk of contamination.

This object is achieved, in accordance with a particularly advantageous embodiment of the invention, through the use of a charging compartment which is provided with a perforated horizontal plate adapted to pass the granules of material. As least one injection nozzle having a substantially horizontal axis traverses one of the end walls of the charging compartment and is supplied by a conveyor system. The nozzle directs the material as far as the opposite end of the charging compartment so that the material accumulates on the plate and then passes through it by gravity to fill the filter beds therebeneath.

The arrangement is such that the nozzle blows the material, not directly into the beds, but rather into the charging compartment. The compartment is separated from the rest of the tank by the perforated plate whose perforations are dimensioned on the basis of the particle size of the material. The material is blown as far as the rear of the compartment, where it arrives at zero velocity, piling up on the perforated plate, then passing through it and dropping into the beds in free fall, thus assuring uniform packing. The perforations in the plate may have any desired configuration (circular or oval holes, slots, etc.).

In accordance with another preferred embodiment of the invention, for tanks having multiple beds the axis of the nozzle is perpendicular to the plane of the beds and is disposed substantially in the vertical plane of symmetry common to the beds. The material which fills the bottom of the charging compartment is distributed symmetrically over the perforated plate and feeds the beds successively, starting with the one farthest from the nozzle.

In accordance with a further advantageous embodiment of the invention, a discharging compartment is provided beneath the filter beds. The bottom of this latter compartment includes a hopper having the form of a dihedron whose arris is inclined to the horizontal toward a drainage fitting disposed at the base of the compartment. The hopper has a dual slope and permits the discharge compartment to be emptied through a single opening.

In accordance with still another good embodiment of the invention, the pneumatic conveyor system for transporting the granular material is of unique construction and arrangement. The system includes an apparatus for aspirating the material which may be connected either to the charging compartment or to the discharging compartment. The conveyor system thus may be used both for charging and for discharging without posing the contamination hazards inherent in prior systems.

Also in accordance with certain embodiments of the invention, the aspirating apparatus is provided with a centrifugal dust-removal device having a first outlet port for the dust-laden air and a second outlet port for the granules. The first outlet port is maintained at subatmospheric pressure to withdraw dust from the material.

Other characteristics and advantages of the invention will become apparent in the course of the following description of certain preferred embodiments, when read with reference to the accompanying drawings.

BRIEF DESCRIPTION OF THE DRAWINGS

In the accompanying drawings, provided by way of example and not of limitation.

DESCRIPTION OF CERTAIN PREFERRED EMBODIMENTS

In accordance with the embodiment shown in FIGS. 1 to 4, the installation comprises a filtration tank 100 intended for freeing an air stream of radioactive contaminants, and a pneumatic conveyor system 200 for charging and discharging granular material from the tank 100. The granular material commonly is in the form of activated carbon which adsorbs the contaminants.

Figure 1:
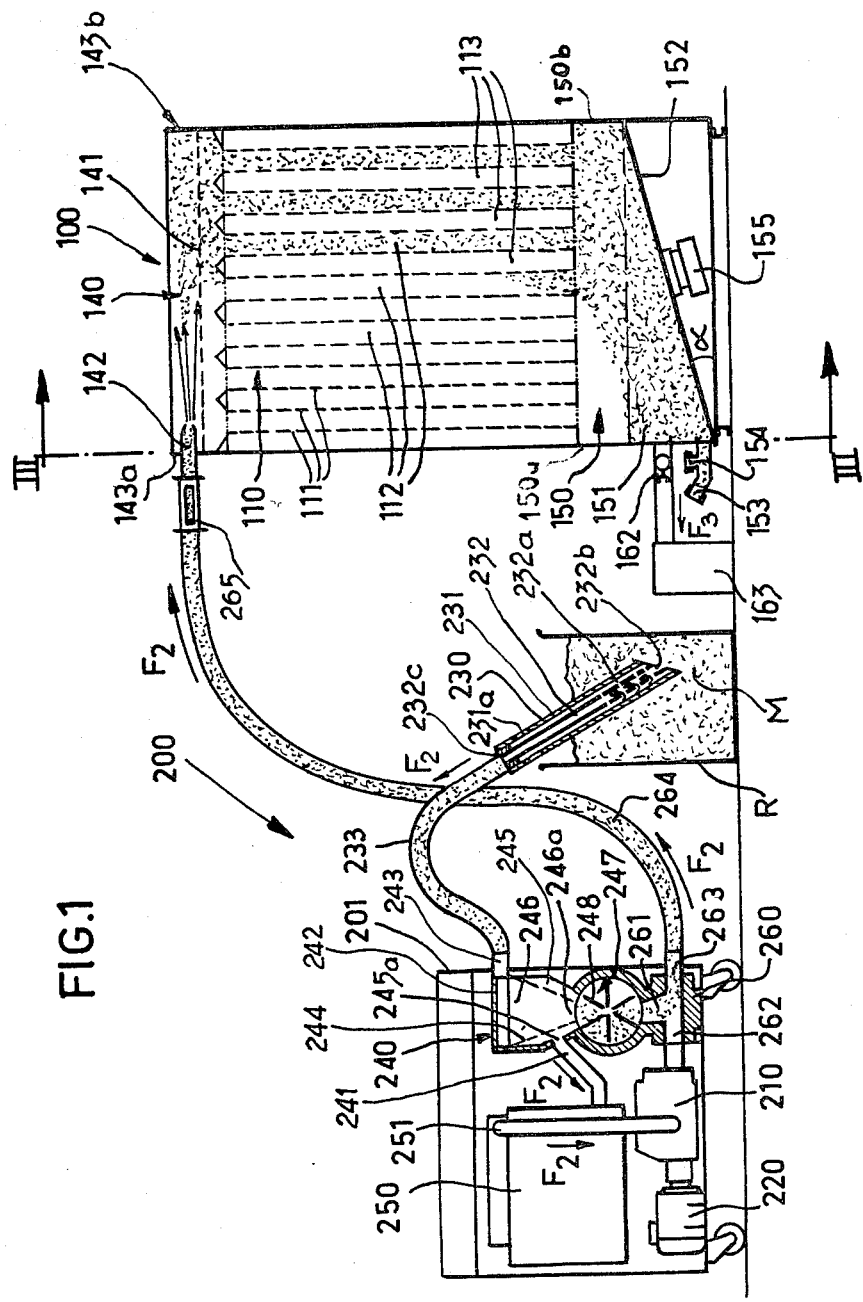
FIG. 1 is a diagrammatic elevational view, partly in section, of an installation in accordance with an illustrative embodiment of the invention during the charging operation.
Figure 2:
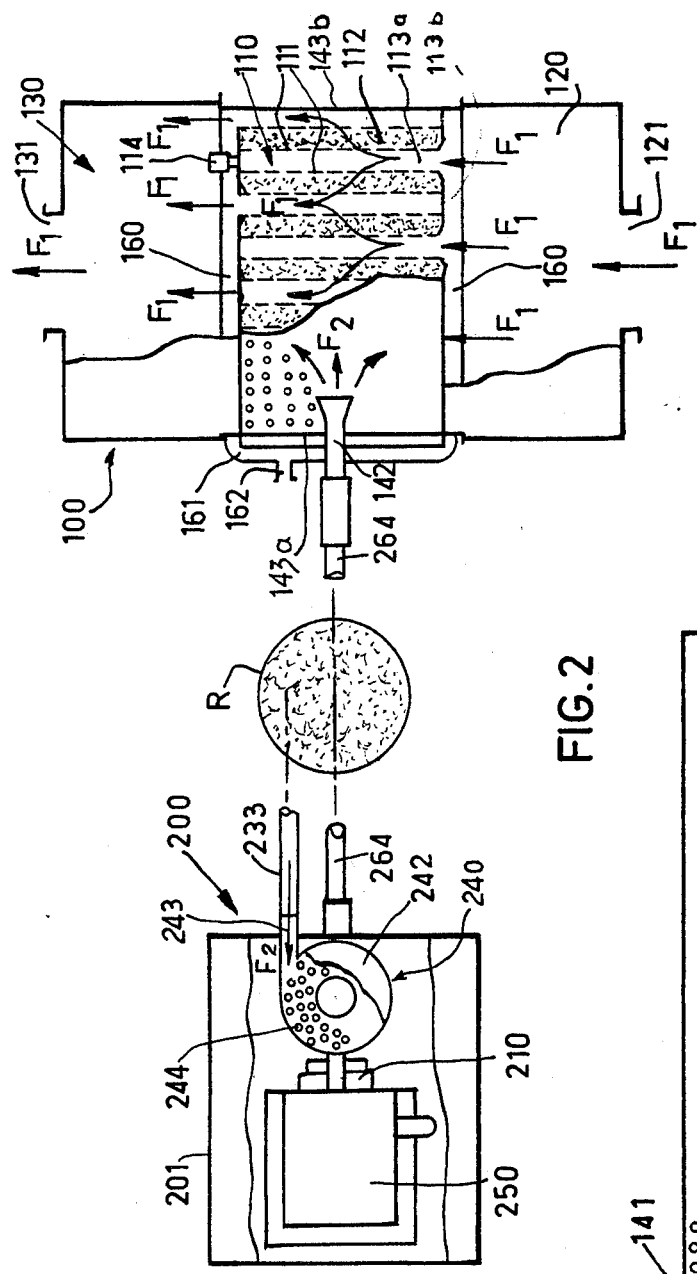
FIG. 2 is a diagrammatic top plan view of the installation of FIG. 1.

The tank 100 includes a central or adsorber section 110. As best seen in FIG. 2, a contaminated-air intake chamber 120 and a purified-air outlet chamber 130 are disposed on opposite sides of the section 110 in communication therewith. The chambers 120 and 130 communicate with the atmosphere through openings 121 and 131, respectively.

The interior of the adsorber section 110 is provided with coplanar vertical perforated baffles 111 which separate the section into filter beds 112 alternating with passages 113. The beds 112 are arranged to receive activated carbon filter material, while the passages 113 permit the circulation of air to be purified. Every other passage, for example, the passage 113a illustrated in FIG. 2, communicates at one of its ends directly with the chamber 120, while its other end is provided with a plug 114 to prevent the passage from communicating directly with the chamber 130. The alternate passages, for example, the passage 113b, are separated from the chamber 120 but communicate with the chamber 130. The arrangement is such that the air which enters the chamber 120 reaches the chamber 130 only after passing through the filter beds 112. The path of the air is indicated in FIG. 2 by the arrows $F_1$.

The tank 100 also includes a charging compartment 140 and a discharging compartment 150. The compartments 140 and 150 are located above and below the adsorber 110, respectively, and both compartments communicate with the filter beds 112.

The charging compartment 140 is provided at its bottom with a horizontal perforated plate 141 whose perforations are sized to pass the activated carbon filter material and hence are based on the particle size of the material which usually ranges from 1.5 to 4 mm. The compartment 140 further includes a nozzle 142 for the injection of the material. The nozzle 142 is disposed above the perforated plate 141 and extends through one of the vertical walls 143a of the compartment.

The discharge axis of the nozzle 142 is substantially horizontal and extends perpendicular to the filter beds 112 in a vertical plane of symmetry common to all of the beds. With this arrangement the granular material from the nozzle is distributed symmetrically and evenly over the perforated plate 141.

The discharging compartment 150 is provided with a discharge hopper 151. The bottom of the hopper 151 is in the form of a dihedron having an angle $\beta$ (FIG. 3) between the planes. The arris 152 of the hopper is inclined at an angle $\alpha$ with respect to the horizontal, rising from the forward wall 150a of the compartment 150 toward its rear wall 150b and extending in the vertical plane of symmetry of the filter beds 112, that is, a plane perpendicular to the planes of the baffles 111. The arris 152 and the discharge axis of the nozzle 142 lie in the same vertical plane. The angles $\alpha$ and $\beta$ are selected on the basis of the characteristics of the material. For an activated carbon of a density of 0.5 and a particle size between 1.5 and 4 mm, the angle $\alpha$ preferably is of the order of fifteen degrees, and the angle $\beta$ is about one hundred and forty degrees.

The lowermost portion of the hopper 151 communicates with a pluggable drainage fitting 153 having an air intake orifice 154. The discharge end of the fitting 153 is turned up by means of a forty-five degree pipe elbow in order to prevent the loss of carbon when the plug is removed. The hopper 151 is provided with a vibrator 155 to facilitate the flow of carbon toward the drainage fitting 153 at the end of the discharge operation.

Two dust recovery troughs 160 are disposed on either side of the adsorber 110 adjacent the lower part thereof, that is, within the chambers 120 and 130. The troughs 160 are inclined with respect to the horizontal at an angle substantially equal to the angle $\alpha$ of the arris of the hopper 151, and the troughs communicate with a dust collector 161 provided with a discharge fitting 162 leading to an industrial exhauster 163. Dust which enters the passages 113 and accumulates in their lower parts is collected in these troughs and is directed through the collector 161 and the fitting 162 to the exhauster 163 as shown by the arrow $F_3$.

The pneumatic conveyor system 200 comprises an arrangement for aspirating the material during both the charging and the discharging of the tank 100 and a blower operable during the charging of the tank. The aspirating arrangement and the blower are mounted on a rolling support 201 to provide a mobile unit.

The aspirator includes a vacuum-producing device 210, illustratively in the form of a centrifugal pump driven by a motor 220, a centrifugal dust-collection device 240, and a filter box 250 of known type formed, for example, by an absolute filter and a sedimentation chamber. The dust collector 240 and the filter box 250 are connected in series by a conduit 241. The suction intake of the vacuum-producing device 210 is connected to the box 250 by a conduit 251.

The blower comprises an injector or booster 260. The booster 260 is supplied with compressed air from the exhaust of the vacuum-producing device 210 and is adapted to be connected to the nozzle 142.

As best shown in FIG. 2, the dust collector 240 includes a substantially cylindrical separator 242. An inlet 243 for the separator discharges the granular material tangentially so as to impart a turbulent motion to the granules, and an internal frustoconical perforated metal sheet 244 permits the passage of only very fine particles of material. The sheet 244 divides the separator 242 into a peripheral dust-collecting chamber 245 (FIG. 1) and a central granules-retaining chamber 246. The peripheral chamber 245 has an outlet 245a connected to the conduit 241, and the central chamber 246 has an outlet 246a. An air lock 247 communicates with the opening 246a and is internally provided with rotating blades 248 driven by a motor (not shown) at a speed based on the desired material throughout rate. The air lock 247 acts as a volumetric pump which passes the granules, freed of dust, from the suction circuit at subatmospheric pressure to the blower circuit at superatmospheric pressure.

The booster 260 has an inlet 261 for the granules which is fed by the air lock 247. Compressed air from the vacuum-producing device 210 is introduced into the booster 260 through an inlet 262, and the granules carried by the compressed air leave the booster through an outlet 263. A charging hose 264 connects the outlet 263 to the nozzle 142 and is provided with a sighting slot 265 adjacent the nozzle.

The conveyor system 200 further comprises a suction conduit 230 for introducing the material into the dust collector 240. The suction conduit 230 is formed by a peripheral tube 231 provided with air-intake ports 231a and an inner tube 232 that is concentric with the tube 231 and is provided with air-intake ports 232a. This tube 232 is open at its lower end 232b, and its opposite end 232c is connected through a suction hose 233 to the inlet 243 of the dust collector 240.

Figure 4:
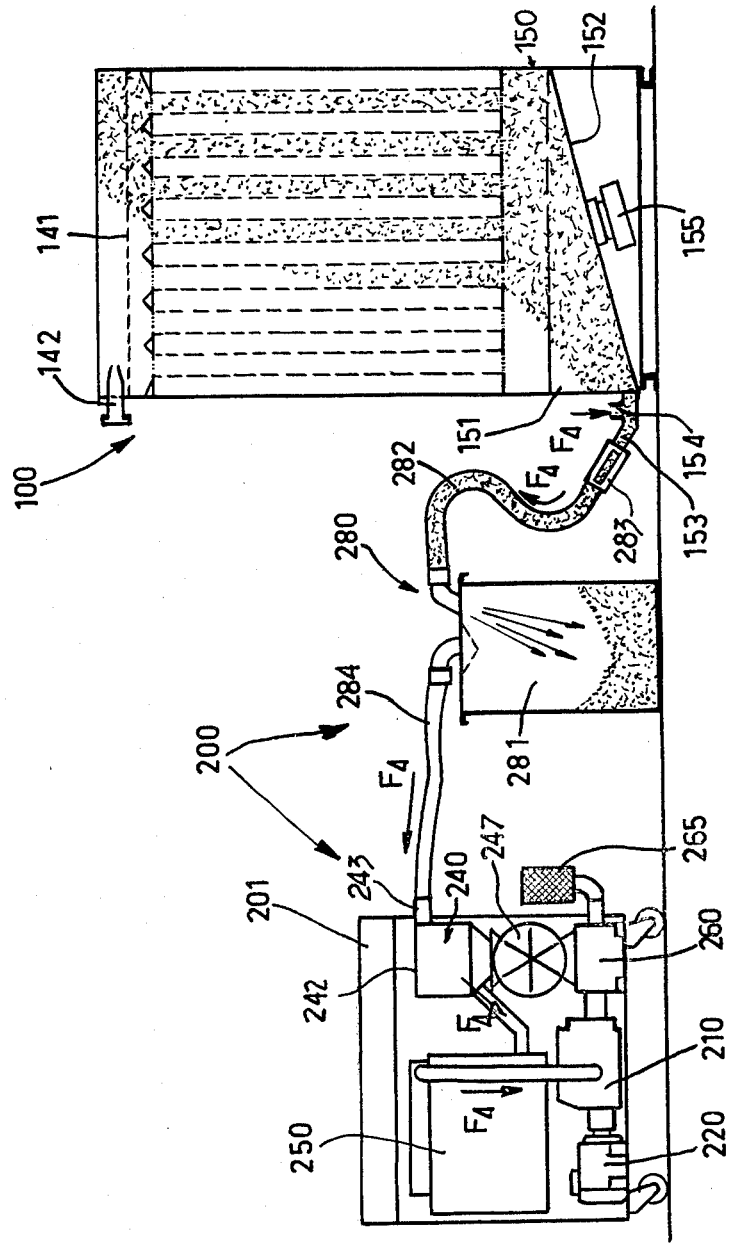
FIG. 4 is a diagrammatic elevational view analogous to FIG. 1 but showing the installation during the discharging operation.

The pickup and storage of the contaminated material is handled by a material receiving apparatus 280 (FIG. 4). The apparatus 280 comprises a storage container 281 closed by a special cover, a discharging hose 282 which connects the drainage fitting 153 to the container 281, and a suction conduit 284 which connects the container 281 to the inlet 243 of the dust collector 240. The hose 282 is provided with a sighting slot 283 at the end thereof adjacent the fitting 153. It will be noted in this connection that to discharge the tank 100 there is no blowing of material. During the discharge the ejector outlet 263 (FIG. 1) is connected to a muffler 265.

To charge the material the suction conduit 230 is inserted in the mass M of material contained in the container R. The motor 220 is turned on, and operation of the exhauster 163 and the rotary air lock 247 is initiated. The material is aspired and is conveyed through the hose 233 to the dust collector 240 for separation of the fine dust, which passes into the chamber 245 and is retained in the filter 250. The granules of material within the central chamber 246 drop into the air lock 247 and are carried by the blades 248 into the ejector 260, from which they are swept by compressed air into the charging hose 264 and the nozzle 142. The path of the air and granules is indicated by the arrow $F_2$. The nozzle 142 blows the material into the charging compartment 140 and as far as its opposite wall 143b, at which point the granules have practically zero velocity. The material drops by gravity and accumulates at the bottom of the compartment 140, that is, on the perforated plate 141. The material then passes through the plate 141 and initially fills the filter bed 112 that is farthest from the nozzle. The remaining beds 112 are filled in succession such that a front of material forms and advances toward the nozzle during the filling operation until all of the beds are filled as well as the discharging compartment 150.

By reason of the perforated plate 141, the granules of material fall vertically into the filter beds 112 without being thrown against their walls. With this arrangement there is little risk of any of the granules fracturing or breaking, and the granules are uniformly packed within the beds.

The discharge of contaminated material is effected by arranging the installation in the configuration illustrated in FIG. 4. With the motor 220 turned on, the storage container 280 is placed under subatmospheric pressure, and the contaminated material is aspired from the lower part of the discharge compartment 150 and is fluidized by the air drawn in through the orifice 154. The material proceeds through the hose 282 to the storage container, where it accumulates without, however, passing into the hose 284. The path of the air and of the particles of material which it carries is indicated by the arrows $F_4$. The vibrator 155 is then actuated to facilitate the discharge of the material. During the discharging operation the separator 242 and the filter 250 serve to remove dust from the material in a manner similar to that described heretofore. The air lock 247 and the ejector 260, on the other hand, remain quiescent.

Throughout the charging and discharging operations, the flow of material can readily be monitored through the sighting slots 265 and 283.

Figure 5:
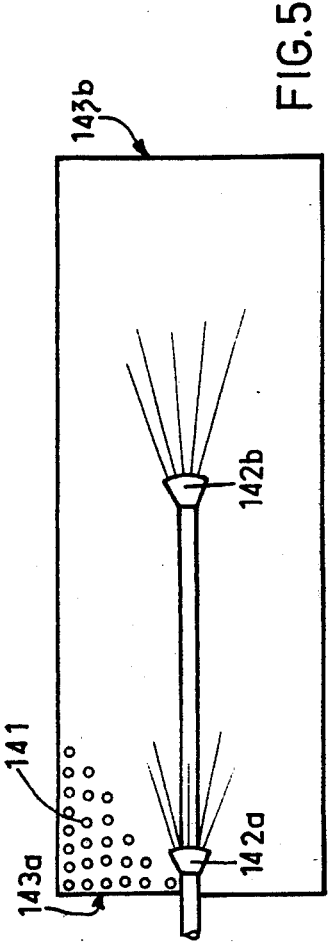
FIG. 5 is a partial diagrammatic top plan view of the installation showing a modified design of charging compartment.
Figure 3:
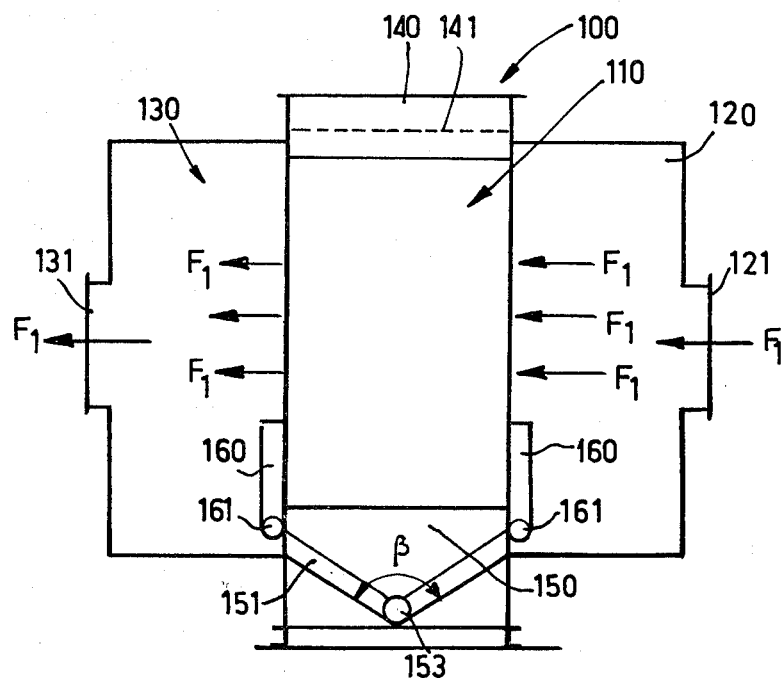
FIG. 3 is a diagrammatic view taken along the line III—III in FIG. 1.

In the embodiment illustrated in FIGS. 1 to 4, the depth of the charging component, that is, the distance between the walls 143a and 143b, is not greater than the maximum range of the nozzle 142. For an activated carbon of a density of 0.5 and for a velocity of 20 to 25 m/sec at the outlet of the nozzle 142, the maximum range is about 2.80 m. For compartments, and hence for tanks, of greater depth, a plurality of nozzles is provided which may be operated alternately or simultaneously. FIG. 5 is illustrative of an installation comprising two superposed nozzles 142a and 142b which permit the optimum supply of material to tanks having a depth of up to 5.20 m.

Figure 6:
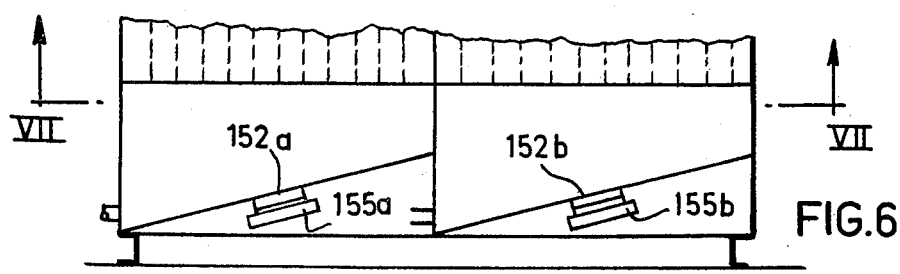
FIG. 6 is a partial diagrammatic elevational view showing a modified design of discharging compartment.
Figure 7:
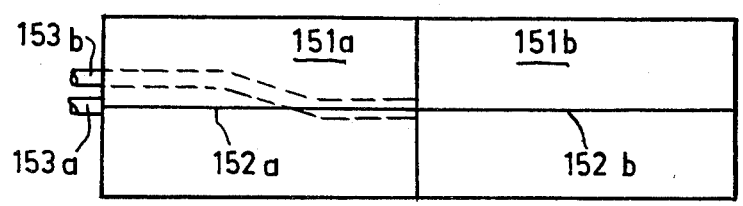
FIG. 7 is a diagrammatic view taken along the line VII—VII in FIG. 6.

In some embodiments of the invention the discharge compartment is provided with a plurality of hoppers in series with each other. FIGS. 6 and 7 are illustrative of such a compartment having two hoppers 151a and 151b with their arrises 152a and 152b in stepped relationship. These hoppers are provided with vibrators 155a and 155b and communicate with drain fittings 153a and 153b, respectively. These hoppers may be discharged alternately or simultaneously.

Installations in accordance with the invention permit the replacement of the filter material under optimum safety conditions since the persons assigned to such replacement are neither in direct nor in indirect contact with the contaminants. Other advantages are that there is little or no change in particle size because of the manner in which the material is introduced into the tank, little or no irregularity of distribution because the beds are filled by gravity, and little or no choking of the charging hose with material because of the rotary air lock.

Moreover, the installation reduces dead time to a minimum because of its handling simplicity, and it also assures optimum uniformity and distribution of the material in the filter beds.

Various modifications may be made to the embodiments described and shown without departing from the scope of the invention.

What is claimed is:

1. In an installation for the filtration contaminated fluid stream, in combination:
   a supply of granular material capable of adsorbing or absorbing contaminants in the stream;
   a filtration tank having at least one filter bed therein for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one end of the end walls of the charging compartment for discharging granular material along a discharge axis parallel to the perforated bottom plate, the discharged material accumulating on the perforated bottom plate and falling by gravity through the perforations therein to fill the filter bed; and a discharging compartment disposed beneath the filtration tank in communication with the filter bed therein, the discharging compartment including a hopper having a discharge fitting for removing contaminated granular material from the bed.

2. In an installation as defined in claim 1, in which the filtration tank is provided with a plurality of coplanar vertical baffles which define a plurality of substantially vertical filter beds for receiving granular material from the supply.

3. In an installation for the filtration of a contaminated fluid stream, in combination:

a supply of granular material capable of adsorbing or absorbing contaminants in the stream;

a filtration tank having at least one filter bed therein for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for discharging granular material horizontally along a discharge axis parallel to the perforated bottom plate, the discharged material accumulating on the perforated bottom plate and passing through the perforations therein to fill the filter bed; and a discharging compartment disposed beneath the filtration tank in communication with the filter bed therein, the discharging compartment including a hopper having a discharge fitting for removing contaminated granular material from the bed.

4. In an installation for the filtration of a contaminated fluid stream, in combination:

a supply of granular material capable of adsorbing or absorbing contaminants in the stream;

a filtration tank having a plurality of coplanar baggles therein to define at least one substantially vertical filter bed for receiving grangular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for discharging granular material horizontally along a discharge axis parallel to the perforated bottom plate, the nozzle means directing the discharged material from said one end wall to the opposed end wall, the discharged material accumulating on the perforated bottom plate and falling by gravity through the perforations therein to fill the filter bed; and a discharging compartment disposed beneath the filtration tank in communication with the filter bed therein, the discharging compartment including a hopper having a discharge fitting for removing contaminated granular material from the bed.

5. In an installation as defined in claim 4, in which the nozzle means comprises a pair of injection nozzles in superposed relationship with each other.

6. In an installation for the filtration of a contaminated fluid stream, in combination:

a supply of granular material capable of adsorbing or absorbing contaminants in the stream;

a filtration tank having at least one substantially vertical filter bed therein for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for discharging granular material horizontally along a discharge axis parallel to the perforated bottom plate, the discharged material accumulating on the perforated bottom plate and passing through the perforations therein to fill the filter bed; and a discharging compartment disposed beneath the filtration tank in communication with the filter bed therein, the discharging compartment including a hopper having a discharge fitting for removing contaminated granular material from the bed and a dihedron shaped bottom, the arris of the bottom being inclined with respect to the horizontal.

7. In an installation for the filtration of a contaminated fluid stream, in combination:

a supply of granular material capable of adsorbing or absorbing contaminants in the stream;

a filtration tank having a plurality of coplanar baffles therein to define at least one substantially vertical filter bed for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for discharging granular material horizontally along a discharge axis which extends parallel to the perforated bottom plate and perpendicular to the planes of said baffles, the nozzle means directing the discharged material from said one end wall to the opposed end wall, the discharged material accumulating on the perforated bottom plate and passing through the perforations therein to fill the filter bed; and a discharging compartment disposed beneath the filtration tank in communication with the filter bed therein, the discharging compartment including a hopper having a discharge fitting for removing contaminated granular material from the bed and a dihedron shaped bottom, the arris of the bottom being inclined with respect to the horizontal and extending in a plane perpendicular to the planes of the baffles.

8. In an installation as defined in claim 7, the discharge axis of the injection nozzle extends substantially in the vertical plane of symmetry common to the baffles.

9. In an installation as defined in claim 7, the discharge fitting extending in an angular upward direction and having an air intake orifice therein.

10. In an installation as defined in claim 7, in which a plurality of the said hoppers are disposed in the discharging compartment.

11. In an installation for the filtration of a contaminated fluid stream, the installation comprising, in combination:

a supply of granular material capable of adsorbing or absorbing contaminants in the stream;

a filtration tank having a plurality of coplanar baffles therein to define a plurality of substantially vertical filter beds for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter beds;

nozzle means positioned adjacent one of the end walls of the charging compartment and including an injection nozzle for discharging granular material horizontally along a discharge axis which extends parallel to the perforated bottom plate and perpendicular to the planes of said baffles, the nozzle means directing the discharged material from said one end wall to the opposed end wall, the discharged material accumulating on the perforated bottom plate and passing through the perforations therein to fill the filter beds;

a discharging compartment disposed beneath the filtration tank in communication with the filter beds therein, the discharging compartment including a hopper having a discharge fitting for removing contaminated granular material from the beds and a dihedron shaped bottom, the arris of the bottom being inclined with respect to the horizontal and extending in a plane perpendicular to the planes of the baffles; and means for vibrating the hopper during the removal of the contaminated material.

12. In an installation as defined in claim 11, the arris of the hopper bottom and the discharge axis of the injection nozzle lying in a single vertical plane.

13. An installation for the filtration of a contaminated fluid stream, the installation comprising, in combination:

a supply of granular material capable of adsorbing or absorbing contaminants in the stream;

a filtration tank having a plurality of baffles therein to define at least one filter bed for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for discharging granular material horizontally along a discharge axis parallel to the perforated bottom plate, the discharged material accumulating on the perforated bottom plate and falling by gravity through the perforations therein to fill the filter bed;

a discharging compartment disposed beneath the filtration tank in communication with the filter bed therein, the discharging compartment including a hopper having a discharge fitting and a dihedron shaped bottom, the arris of the bottom being inclined with respect to the horizontal;

means communicating with the nozzle means for aspirating the granular material prior to its introduction into the charging compartment.

14. An installation for the filtration of a contaminated fluid stream, the installation comprising, in combination:

a supply of granular material capable of adsorbing or absorbing contaminants in the stream;

a filtration tank having a plurality of baffles therein to define at least one substantially vertical filter bed for receiving granular material from the supply;

means for directing the fluid stream through the filter bed to remove contaminants from the stream;

a charging compartment disposed above the filtration tank in close juxtaposition therewith, the charging compartment having a pair of opposed end walls and a perforated bottom plate for permitting the passage of granular material therethrough to the filter bed;

nozzle means positioned adjacent one of the end walls of the charging compartment and including an injection nozzle for directing granular material horizontally along a discharge axis which extends perpendicular to the planes of said baffles, the discharged material accumulating on the perforated bottom plate and passing through the perforations therein to fill the filter bed;

a discharging compartment disposed beneath the filtration tank in communication with the filter bed therein, the discharging compartment including a hopper having a discharge fitting and a dihedron shaped bottom, the arris of the bottom being inclined with respect to the horizontal;

aspirating means selectively connectable to the charging compartment and the discharging compartment, the aspirating means including a receptacle for contaminated granular material and a discharge conduit connected to the receptacle, the aspirating means communicating with the supply of granular material and with the nozzle means when connected to the charging compartment, and the aspirating means communicating with the discharge conduit when connected to the discharging component.

15. An installation as defined in claim 14 which further comprises, in combination:
   means including a pair of dust-recovering troughs disposed on opposite sides of the baffles in the filtration tank; and
   a discharge collector common to each of the troughs for receiving dust therefrom.

16. An installation for the filtration of a contaminated fluid stream, the installation comprising, in combination:
   a supply of granular material capable of adsorbing or absorbing contaminants in the stream;
   a filtration tank having a plurality of coplanar baffles therein to define at least one substantially vertical filter bed for receiving granular material from the supply;
   means for directing the fluid stream through the filter bed to remove contaminants from the stream;
   a charging compartment disposed above the filtration tank in close juxtaposition therewith, the charging compartment having a pair of opposed end walls and a perforated bottom plate for permitting the passage of granular material therethrough to the filter bed;
   nozzle means positioned adjacent one of the end walls of the charging compartment and including an injection nozzle for directing granular material horizontally along a discharge axis which extends perpendicular to the planes of said baffles from said one end wall to the opposed end wall, the discharged material accumulating on the perforated bottom plate and passing through the perforations therein to fill the filter bed;
   a discharging compartment disposed beneath the filtration tank in communication with the filter bed therein, the discharging compartment including a hopper having a discharge fitting and a dihedron shaped bottom, the arris of the bottom being inclined with respect to the horizontal and extending in a plane perpendicular to the planes of the baffles; and
   aspirating means selectively connectable to the charging compartment and the discharging compartment, the aspirating means including a receptacle for contaminated granular material, a discharge conduit communicating with the receptacle, a dust-removing device having an inlet and a pair of outlets, and a pressure-reducing device communicating with one of said outlets, the inlet of the dust-removing device communicating with the supply of granular material and the other outlet communicating with the nozzle means when the aspirating means is connected to the charging compartment, and the inlet communicating with said receptacle and the discharge conduit communicating with the discharge fitting on said hopper when the aspirating means is connected to the discharging compartment.

17. An installation as defined in claim 16, which further comprises, in combination:
   tube means for connecting the inlet of the dust-removing device with the supply of granular material during the charging of the charging compartment, the tube means including an inner tube for supplying granular material to the dust-removing device and a concentric outer tube communicating with the inner tube.

18. An installation for the filtration of a contaminated fluid stream, the installation comprising, in combination:
   a supply of granular material capable of adsorbing or absorbing contaminants in the stream;
   a filtration tank having a plurality of baffles therein to define at least one substantially vertical filter bed for receiving granular material from the supply;
   means for directing the fluid stream through the filter bed to remove contaminants from the stream;
   a charging compartment disposed above the filtration tank in close juxtaposition therewith, the charging compartment having a pair of opposed end walls and a perforated bottom plate for permitting the passage of granular material therethrough to the filter bed;
   nozzle means positioned adjacent one of the end walls of the charging compartment and including an injection nozzle for directing granular material horizontally along a discharge axis which extends perpendicular to the planes of said baffles, the discharged material accumulating on the perforated bottom plate and passing through the perforations therein to fill the filter bed;
   a discharging compartment beneath the filtration tank in communication with the filter bed therein, the discharging compartment including a hopper having a discharge fitting and a dihedron shaped bottom, the arris of the bottom being inclined with respect to the horizontal; and
   aspirating means selectively connectable to the charging compartment and the discharging compartment, the aspirating means including a receptacle for contaminated granular material, a discharge conduit communicating with the receptacle, a centrifugal dust-removing device having an inlet and a pair of outlets, and a pressure-reducing device communicating with one of said outlets, the inlet of the dust-removing device communicating with the supply of granular material and the other outlet communicating with the nozzle means when the aspirating means is connected to the charging compartment, and the inlet communicating with said receptacle and the discharge conduit communicating with the discharge fitting on said hopper when the aspirating means is connected to the discharging compartment.

19. An installation as defined in claim 18, in which the dust-removing device includes an internal frustoconical sheet for dividing the interior of the device into a peripheral chamber and a central chamber, said one outlet communicating with the peripheral chamber and said other outlet communicating with the central chamber.

* * * * *